United States Patent [19]

Villarruel et al.

[11] 4,165,914
[45] Aug. 28, 1979

[54] ACCESS COUPLER AND DUPLEX COUPLER FOR SINGLE MULTIMODE FIBER TRANSMISSION LINE

[75] Inventors: Carl A. Villarruel, Alexandria, Va.; A. Fenner Milton, Washington, D.C.

[73] Assignee: The United States of America as represented by the Secretary of the Navy, Washington, D.C.

[21] Appl. No.: 868,361

[22] Filed: Jan. 10, 1978

[51] Int. Cl.² .............................................. G02B 5/14
[52] U.S. Cl. .............................. 350/96.16; 350/96.17; 350/96.20
[58] Field of Search ............... 350/96.15, 96.16, 96.17, 350/96.20, 96.21

[56] References Cited

U.S. PATENT DOCUMENTS

| 3,870,396 | 3/1975 | Racki et al. | 350/96.16 |
| 4,021,099 | 5/1977 | Kawasaki et al. | 350/96.21 |
| 4,030,811 | 6/1977 | Khoe et al. | 350/96.17 |
| 4,092,061 | 5/1978 | Stigliani, Jr. | 350/96.15 |

FOREIGN PATENT DOCUMENTS

| 969744 | 6/1975 | Canada | 350/96.21 |
| 2328973 | 5/1977 | France | 350/96.15 |

Primary Examiner—John K. Corbin
Assistant Examiner—John D. Lee
Attorney, Agent, or Firm—R. S. Sciascia; Philip Schneider; Melvin L. Crane

[57] ABSTRACT

Optical access and duplex couplers for multimode, fiber, data transmission lines. Access couplers are for use with multiterminal communication systems whereas duplex couplers allow a single fiber to be used for data transmission in both directions. Grooves of different depths and widths are etched into silicon along natural crystal planes to position fibers of different diameters and to provide reflective silvered surfaces. Optical communication signals pass through smaller-diameter transmission lines to larger lines. Light surrounding the smaller-diameter line from the larger line is reflected by the reflective surfaces. Thus, information may be received and added as desired.

5 Claims, 6 Drawing Figures

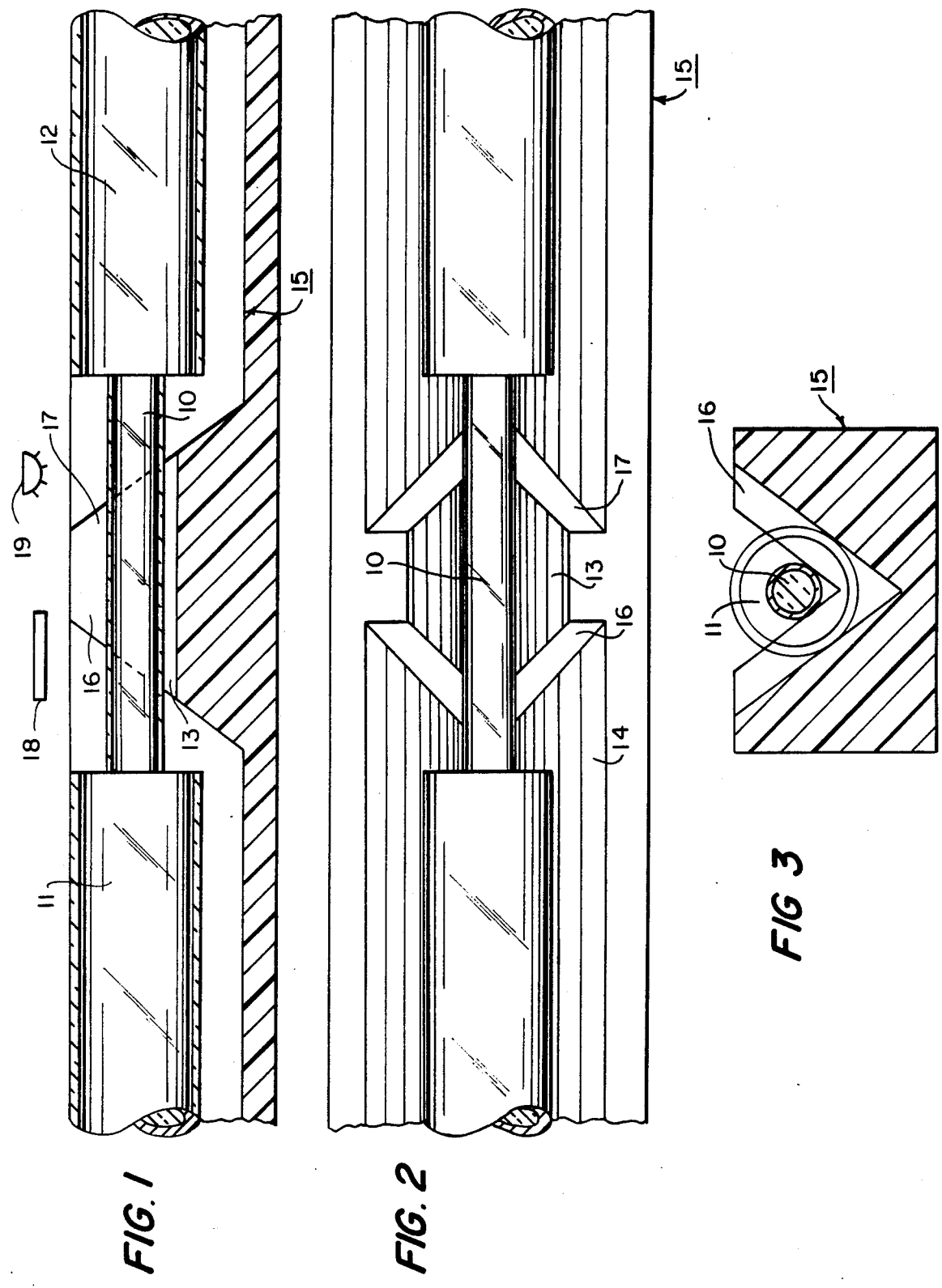

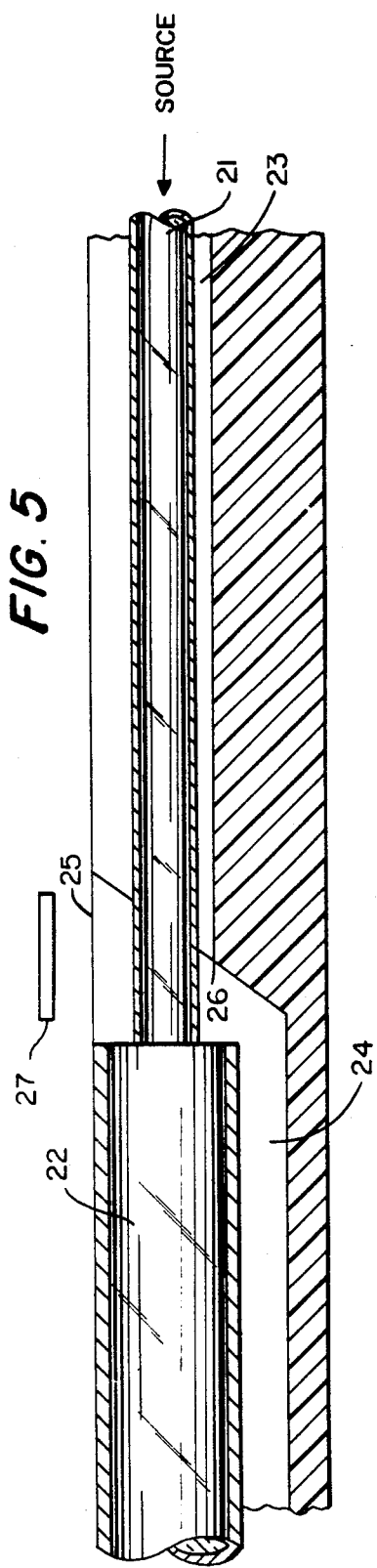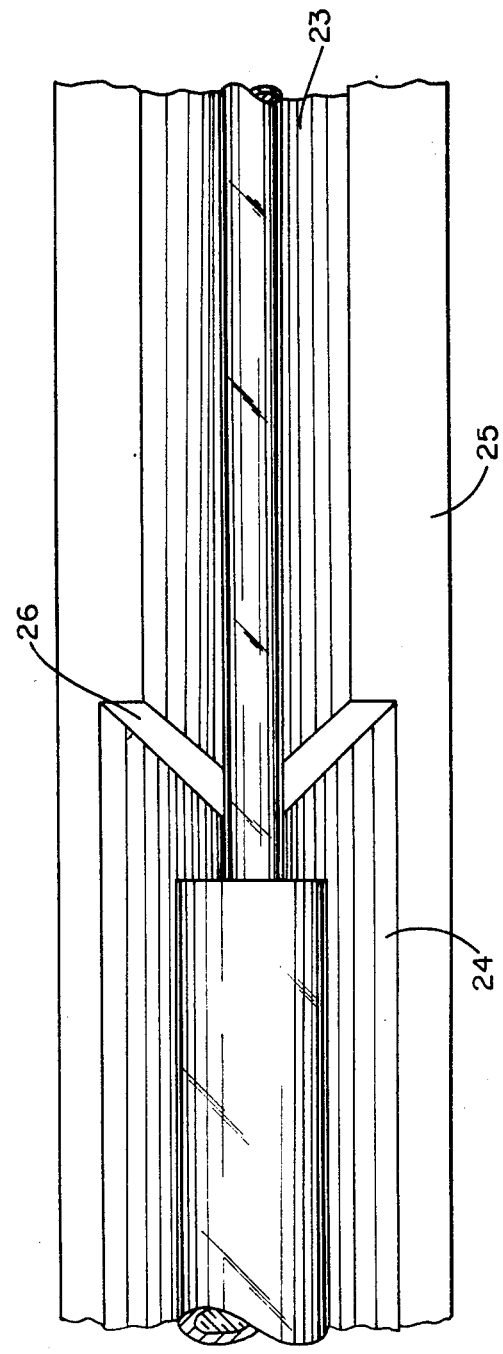

ACCESS COUPLER AND DUPLEX COUPLER FOR SINGLE MULTIMODE FIBER TRANSMISSION LINE

BACKGROUND OF THE INVENTION

This invention relates to optical access and duplex couplers and more particularly to access and duplex couplers for single, multimode, fiber, data transmission lines.

Communication systems using single optical fibers have been proposed for two-way communication. These require special coupling means in order to transmit and receive information, especially for single, multimode, fiber, data transmission lines. The present invention provides means for coupling and receiving optical information.

SUMMARY OF THE INVENTION

Access couplers are for use with multichannel communication systems (data buses) whereas duplex couplers allow the use of a single fiber for data transmission in both directions. The throughput single fiber is smaller than the transmission line thereby permitting throughout transmission of information simultaneously with detection and adding information to the system without undue loss. The throughput fiber is sufficiently smaller than the transmission line fiber and to reflect radiation from the transmission line to the detector. The single fibers are mounted on a support containing V-grooves which are formed by a one-step preferential etch process. The support includes reflective surfaces which reflect radiation to a detector and/or from a source into the transmission line.

BRIEF DESCRIPTION OF THE DRAWINGS

FIG. 1 is a side view of an access coupler.
FIG. 2 is a top view of the coupler shown in FIG. 1.
FIG. 3 is an end view of the coupler shown in FIG. 1.
FIG. 5 is a side view of a duplex coupler
FIG. 6 is a top view of FIG. 5.

DETAILED DESCRIPTION

Figure 4:
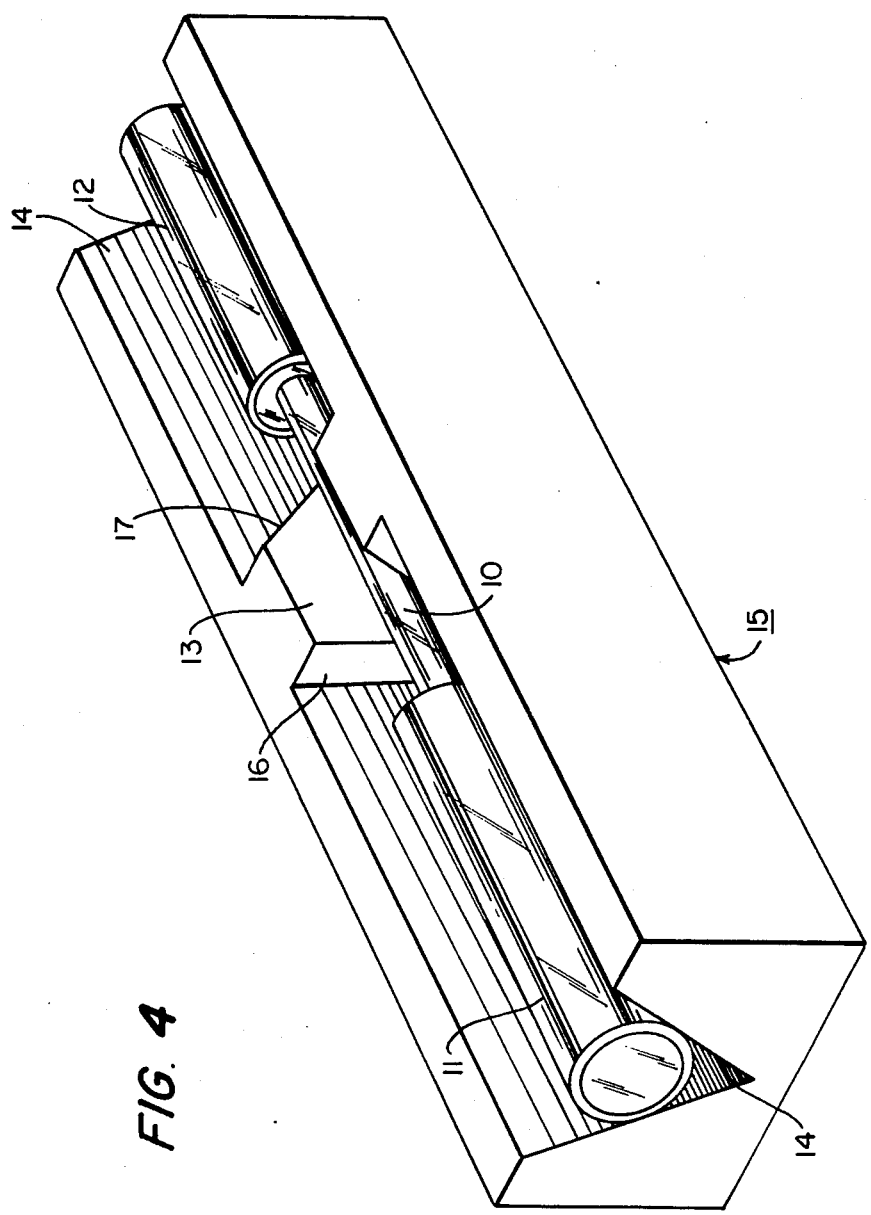
FIG. 4 is a perspective view of the device shown in FIG. 1.

The side views shown in FIGS. 1-4 illustrate a throughput fiber 10 between two transmission line fibers 11 and 12. Each of the fibers are held in place relative to each other by V-grooves 13 and 14 etched in a silicon support 15. The throughput line is smaller in diameter than the transmission line fibers and may be in axial alignment therewith. Therefore the V-grooves in the portion supporting the throughput fiber is smaller than that of the portion supporting the transmission line fibers. The ends of the V-groove portion supporting the throughput fiber facing the end of the transmission line fiber are naturally formed on a 54-degree angle by the etch process, which angle is dictated by the crystal structure. The facings may be silvered to enhance the reflectivity of surfaces 16 and 17 for reflecting transmitted radiation to a detector 18 and for reflecting radiation from a source 19 into the transmission line fiber. The reflective end surfaces are shown better in the top view in FIG. 2, the end view in FIG. 3 and the perspective view FIG. 4.

The throughput fiber and transmission line fibers are made with a core made of a transparent material having a high refractive index and covered with a thin cladding of a material having a lower index of refraction than that of the core, as is well known in the art.

One of the advantages of the coupler-holder is that the input and output paths are conveniently provided by the reflective ends of the V-grooves. The V-grooves are precisely fabricated with the surface along the 111 cyrstallographic direction by preferential chemical etching through a photo-lithographically defined mask. V-grooves of different width and length are formed for different diameter fibers. A preferential etch avoids undercutting of the mask and leaves smooth surfaces along the desired crystallographic directions. Once the V-grooves have been formed, the angular sloped ends are silvered to enhance their reflectivity. After the V-grooves have been etched and the end portions silvered, the throughput fiber and the transmission line fibers are positioned in the V-grooves with one end of each facing each other. Subsequent to positioning the optical fibers in the V-grooves, the detector and source are placed in position relative to the reflective V-groove end surfaces. Since the transmission line fiber is larger than the throughput fiber, the fibers do not have to be in precise axial alignment.

In the access coupler shown in FIGS. 1-4, the smaller diameter throughput fiber is held in a small V-groove between the two larger diameter transmission line fibers held in place in larger V-grooves. Light passing through the smaller-diameter fiber passes as throughput light between the two larger-diameter transmission line fibers. Light which exits from the transmission line fiber in the area of greater diameter and surrounds the throughput fiber is reflected up by the silvered end surface to the detector 18. Similarly, at the other interface, source radiation may be directed onto the reflective end surface and reflected into the transmission line fiber for input. This input is added to the radiation transmitted through the throughput fiber 10 which enters the transmission line fiber and is transmitted thereby. Thus, the coupler provides a means by which radiation transmitted through the transmission line fiber can be detected and source radiation may be added to the radiation transmitted through the coupler. The silicon fiber holder not only serves to position the fibers in proper alignment but the silvered end-faces serve as reflective surfaces that reflect radiation from the transmission-line-fiber end to the detector and from a source into the transmission line fiber.

In aligning a smaller transmission line with a larger transmission line there need not be accurate axial alignment since the smaller diameter line is smaller and thus may be off the center of the larger transmission line and yet mate with the latter, as desired. In this system, the greatest amount of power possible will be transmitted with very little loss between the smaller and larger fibers.

FIGS. 5 and 6 illustrate a duplex coupler which couples radiation from a source through a small-diameter single fiber 21 to a larger-diameter single fiber 22. The V-grooves 23 and 24 in the fiber holder 25 are etched to position the smaller and larger-diameter single fibers in end-to-end alignment with each other. The end surface 26 of the holder formed by the interface between the V-groove and the larger V-groove is silvered and serves to reflect the radiation from the larger-diameter fiber, which surrounds the smaller-diameter fiber, to a detector 27. The angle of the slope of the silvered end-face is 54 degrees which is naturally formed along the 111 plane of the silicon crystal holder.

The access coupler as shown in FIGS. 5 and 6 is for use with multiterminal communication systems (data buses) whereas the duplex coupler as shown in FIGS. 1–4 allows a single fiber to be used for data transmission in both directions.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A fiber optic coupler for an optical transmission line comprising:
    a fiber holder,
    said fiber holder including a first section and a second section,
    said first section having a V-shaped groove therein,
    said second section having V-shaped groove therein with the V-shaped groove in alignment with said first-section groove with the depth and width of said second-section groove less than the depth and width of said first-section groove, the junction of said first-section groove with said second-section groove forming a first sloped angular end with the slope toward said second-section groove;
    a first single optical fiber positioned in said first-section groove,
    a second single optical fiber, of smaller cross-sectional dimension than said first optical fiber, positioned in said second section groove, said second optical fiber including first and second ends with said first end abutting one end of said first single optical fiber and in optical alignment therewith;
    whereby optical radiation may be transmitted through said second single optical fiber directly into one end of said first single optical fiber and a portion of any radiation directed toward said second single optical fiber through said first single optical fiber surrounding said first single optical fiber is reflected outward by the first sloped angular end, and radiation directed onto said first sloped angular end is reflected into the end portion of said first optical fiber that surrounds said second optical fiber.

2. A fiber optic coupler for an optical transmission line as claimed in claim 1 wherein:
    said first and second optical fibers are cylindrical.

3. A fiber optic-coupler for an optical transmission line as claimed in claim 2 wherein:
    said first and second optical fibers are positioned in axial alignment with each other.

4. A fiber optic coupler as claimed in claim 1 wherein:
    said first angular sloped end is silvered for reflectivity.

5. A fiber optic-coupler as claimed in claim 1 in which:
    said fiber holder includes a third section,
    said third section having a V-shaped groove the same as that of said first section in alignment therewith with a second reflective, sloped angular end sloping upwardly toward said V-groove in said second section, and
    a third single optical fiber positioned in said V-groove in said third section with one end in abutting, optical alignment with said second end of said second optical fiber,
    whereby radiation transmitted into said first end of said second optical fiber by said first optical fiber will be transmitted into said third single optical fiber and radiation from a source may be reflected into said third optical fiber by said second sloped angular end; and
    radiation transmitted by said third optical fiber toward said second optical fiber will be coupled into said second end of said second optical fiber with radiation from said third optical fiber that surrounds the end of said second optical fiber reflected out by said second reflective surface.

* * * * *